(12) United States Patent
Parimi

(10) Patent No.: US 11,290,365 B2
(45) Date of Patent: Mar. 29, 2022

(54) OPTIMIZING HOW TEST PACKETS ARE SENT DURING CONTINUOUS NETWORK MONITORING

(71) Applicant: Microsoft Technology Licensing, LLC, Redmond, WA (US)

(72) Inventor: Krishna Chaitanya Parimi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 16/528,382

(22) Filed: Jul. 31, 2019

(65) Prior Publication Data
US 2021/0036946 A1 Feb. 4, 2021

(51) Int. Cl.
H04L 12/26 (2006.01)
H04L 45/02 (2022.01)
H04L 45/16 (2022.01)
H04L 45/00 (2022.01)

(52) U.S. Cl.
CPC .............. *H04L 45/02* (2013.01); *H04L 45/16* (2013.01); *H04L 45/20* (2013.01)

(58) Field of Classification Search
None
See application file for complete search history.

(56) References Cited

U.S. PATENT DOCUMENTS

| 8,634,308 | B2 | 1/2014 | Vobbilisetty et al. |
| 8,750,288 | B2 | 6/2014 | Nakil et al. |
| 9,419,889 | B2 | 8/2016 | Xiao et al. |
| 9,621,453 | B1 | 4/2017 | Pani et al. |
| 2004/0260755 | A1 | 12/2004 | Bardzil et al. |
| 2007/0189184 | A1 | 8/2007 | Ryu et al. |
| 2009/0198832 | A1* | 8/2009 | Shah ............... H04L 41/0668 709/239 |
| 2011/0085449 | A1 | 4/2011 | Jeyachandran et al. |

FOREIGN PATENT DOCUMENTS

EP 3382954 A1 10/2018

OTHER PUBLICATIONS

"International Search Report and Written Opinion Issued in PCT Application No. PCT/US20/036536", dated Sep. 18, 2020, 12 Pages.
Zeng, et al., "NetSonar: A Gray Box Tester for Large Networks", Retrieved Date: Jun. 19, 2019, 14 Pages.
Augustin, et al., "Multipath Tracing with Paris Traceroute", In Proceedings of Workshop on End-to-End Monitoring Techniques and Services, May 21, 2007, 8 Pages.

* cited by examiner

*Primary Examiner* — Zewdu A Beyen
(74) *Attorney, Agent, or Firm* — Ray Quinney & Nebeker P.C; James Bullough

(57) ABSTRACT

A computer-implemented method includes receiving network topology information about a network segment between a source node and a destination node. The method also includes identifying, based on the network topology information, a significant hop in the network segment. The method additionally includes calculating a plurality of probabilistic cover values based on the significant hop. The method additionally includes causing a plurality of different sets of traceroute packets to be sent from the source node. The plurality of different sets of traceroute packets are based on the plurality of probabilistic cover values.

19 Claims, 9 Drawing Sheets

OPTIMIZING HOW TEST PACKETS ARE SENT DURING CONTINUOUS NETWORK MONITORING

CROSS-REFERENCE TO RELATED APPLICATIONS

N/A

BACKGROUND

In general terms, network monitoring refers to the process of maintaining ongoing awareness of various aspects of a computer network, including whether network components (e.g., routers, switches) are functioning properly. It can be important for network monitoring to be performed continuously, as opposed to merely being performed on a periodic basis. This is particularly true for large and complex computer networks, such as the networks utilized by cloud computing providers and large enterprises.

Active testing is typically performed as part of continuous network monitoring. Active testing may be used, for example, to identify faults that lead to packet loss or high latency. With active testing, test agents (which may be located at the network boundary) send test packets along network paths. A simple active testing technique sends test packets between each pair of test agents. This technique may be referred to as a "black box" technique because it requires no knowledge of the network. However, to effectively test a large network, many test agents are needed, which leads to an extremely large number of test packets per test interval. Even then, it is difficult to determine what fraction of links and routers were covered by the test packets.

To overcome these shortcomings, researchers have proposed techniques that may be referred to as "white box" testing. These techniques require detailed information about the network, such as information about how routers in the network process a given packet. Using this information, they compute a subset of all possible test packets that can cover all the routers and links in the network. However, white box testing is impractical in a very large network because of the amount of information it needs to gather. The use of multipath routing techniques such as equal-cost multi-path (ECMP) routing further complicate the use of white box testing techniques. With ECMP, the outgoing link of a packet is decided by hashing packet headers. The hash function may not be known to the network operator.

So-called "gray box" testing techniques have been proposed for large computer networks. The basic idea underlying gray box testing techniques is that the testing that is performed on a particular network should be based on easily obtainable information about the network. The testing techniques should then use that information to send test packets that efficiently cover all links and routers with a high degree of probability, without requiring highly precise information about how individual routers forward traffic.

Within a large computer network, there are typically many potential paths that a packet can travel between a source node and a destination node. In this context, the term "source node" may refer to a computing device that sends data packets, and the term "destination node" may refer to a computing device that receives data packets. A "potential path" refers to a path that a data packet sent from a source node can travel on its way to a destination node. To monitor the network in a comprehensive way, it is desirable to send test packets that are likely to travel across each of those potential paths. (In this context, the term "test packets" refers to packets that are merely sent for the purpose of testing the network, and not as part of the regular operation of the network.) If too many test packets are sent, however, this can degrade network performance. Therefore, it is also desirable to minimize the burden on the network from sending test packets. There is a tension between these competing goals, because one way to increase the comprehensiveness of network testing is to increase the number of test packets that are sent. However, increasing the number of test packets increases the burden on the computer network.

SUMMARY

In accordance with one aspect of the present disclosure, a computer-implemented method is disclosed that includes receiving network topology information about a network segment between a source node and a destination node and identifying, based on the network topology information, a significant intermediate node in the network segment. The significant intermediate node is included in a plurality of paths between the source node and the destination node. The method also includes determining a first plurality of potential paths from the source node to the significant intermediate node, calculating a first probabilistic cover value based on the first plurality of potential paths, and causing a first set of traceroute packets to be sent from the source node. The first set of traceroute packets is based on the first probabilistic cover value. The method also includes determining a second plurality of potential paths from the significant intermediate node to a subsequent node, calculating a second probabilistic cover value based on the second plurality of potential paths, and causing a second set of traceroute packets to be sent from the source node. The second set of traceroute packets is based on the second probabilistic cover value.

The first set of traceroute packets may start from a first time-to-live (TTL) value corresponding to the source node. The second set of traceroute packets may start from a second TTL value corresponding to the significant intermediate node.

Identifying the significant intermediate node may include identifying an Internet protocol (IP) address or a time-to-live (TTL) value that appears more than once in the network topology information.

The first set of traceroute packets may include a first plurality of routing parameter combinations corresponding to the first probabilistic cover value. The second set of traceroute packets may include a second plurality of routing parameter combinations corresponding to the second probabilistic cover value.

The subsequent node may be the destination node.

The subsequent node may be another significant intermediate node in the network segment.

The method may further include identifying a plurality of significant intermediate nodes in the network segment. A plurality of different sets of traceroute packets may include, for each significant intermediate node of the plurality of significant intermediate nodes, a set of traceroute packets that starts from a time-to-live (TTL) value corresponding to the significant intermediate node.

The method may further include identifying a plurality of significant intermediate nodes in the network segment. A plurality of probabilistic cover values may be calculated based on the plurality of significant intermediate nodes.

The method may further include identifying a plurality of significant intermediate nodes in the network segment and creating a plurality of estimates, each estimate indicating a reduction in traceroute packets corresponding to one of the plurality of significant intermediate nodes. The method may further include selecting one of the plurality of significant intermediate nodes based on the estimates.

In accordance with another aspect of the present disclosure, a computer-implemented method is disclosed that includes receiving network topology information about a network segment between a source node and a destination node and identifying, based on the network topology information, a significant intermediate node in the network segment. The method may further include causing a plurality of different sets of traceroute packets to be sent from the source node. The plurality of different sets of traceroute packets may include a first set of traceroute packets that starts from a first time-to-live (TTL) value. The plurality of different sets of traceroute packets may further include a second set of traceroute packets that starts from a second TTL value that is different from the first TTL value and that corresponds to the significant intermediate node.

The method may further include calculating a plurality of probabilistic cover values in response to identifying the significant intermediate node. The plurality of probabilistic cover values may include a first probabilistic cover value that is calculated based on a first plurality of potential paths from the source node to the significant intermediate node and a second probabilistic cover value that is calculated based on a second plurality of potential paths from the significant intermediate node to a subsequent node in the network segment.

The first set of traceroute packets may include a first plurality of routing parameter combinations corresponding to the first probabilistic cover value. The second set of traceroute packets may include a second plurality of routing parameter combinations corresponding to the second probabilistic cover value.

The subsequent node may be the destination node.

The subsequent node may be another significant intermediate node in the network segment.

The method may further include identifying a plurality of significant intermediate nodes in the network segment. The plurality of different sets of traceroute packets may include, for each significant intermediate node of the plurality of significant intermediate nodes, a set of traceroute packets that starts from a TTL value corresponding to the significant intermediate node.

The method may further include identifying a plurality of significant intermediate nodes in the network segment and calculating a plurality of probabilistic cover values based on the plurality of significant intermediate nodes.

The method may further include identifying a plurality of significant intermediate nodes in the network segment and creating a plurality of estimates, each estimate indicating a reduction in traceroute packets corresponding to one of the plurality of significant intermediate nodes. The method may further include selecting one of the plurality of significant intermediate nodes based on the estimates.

In accordance with another aspect of the present disclosure, a computer-implemented method is disclosed that includes receiving, at a source node, a command to send a plurality of different sets of traceroute packets across a network segment comprising a plurality of potential paths. The method also includes sending a first set of traceroute packets from the source node. The first set of traceroute packets starts from a first time-to-live (TTL) value corresponding to the source node. The method also includes sending a second set of traceroute packets from the source node. The second set of traceroute packets starts from a second TTL value corresponding to a significant intermediate node in the network segment.

The command may include an indication of the second TTL value.

The first set of traceroute packets may include a first plurality of routing parameter combinations. The second set of traceroute packets may include a second plurality of routing parameter combinations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
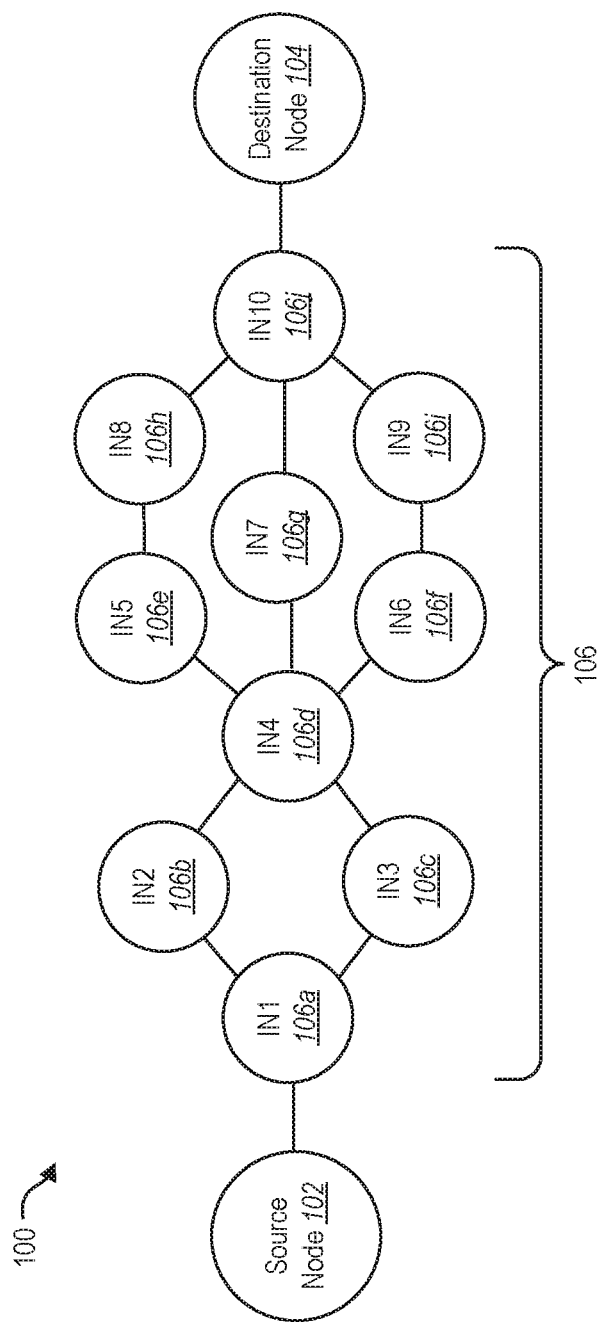
FIG. 1 illustrates an example of a network segment that may be monitored in accordance with the techniques disclosed herein.

The present disclosure is generally related to balancing the competing tensions of performing continuous network monitoring in a comprehensive way while also minimizing the burden on the network from sending test packets.

As indicated above, gray box testing techniques have been proposed for large computer networks. One gray box testing technique is commonly referred to as NetSonar. The NetSonar technique involves the use of test agents that run on production servers. In some implementations, each test agent includes two test clients: a traceroute client and a ping client. The traceroute client collects path information, while the ping client collects latency information. Both the traceroute client and the ping client send packets across the network. The packets sent by the ping client may be referred to as ping packets, and the packets sent by the traceroute client may be referred to as traceroute packets. In some implementations, each test agent may be configured to perform the functionality of the traceroute client and the ping client described above without having two separate clients.

In general, the traceroute client is configured to determine the route that is traveled by a particular packet across an IP network. The traceroute client accomplishes this by sending multiple traceroute packets that have the same combination of routing parameters (e.g., the same combination of source IP address, source port, destination IP address, destination port, and protocol, also known as a "5-tuple") and that have time-to-live (TTL) values that gradually increase, starting with a TTL value of one.

Consider an example involving traceroute packets that will be referred to as $T_1$, $T_2$, $T_3$, and so forth. The traceroute packets have the same combination of routing parameters (e.g., the same 5-tuple). However, the traceroute packets have different TTL values. In the present example, it will be assumed that $T_1$ has a TTL value of one, $T_2$ has a TTL value of two, $T_3$ has a TTL value of three, and so forth.

When $T_1$ (TTL=1) is sent, the first router receives $T_1$, decrements the TTL value, and drops $T_1$ because $T_1$ then has a TTL value of zero. The first router then sends an error message back to the source. The error message may be an Internet Control Message Protocol (ICMP) response packet indicating that the TTL has been exceeded in transit. It is possible to extract the IP address of the sender (which is the first router in this case) from the ICMP response packet. In other words, the error message (e.g., the ICMP response packet) includes the first router's IP address.

When $T_2$ (TTL=2) is sent, the first router receives $T_2$, decrements the TTL value, and forwards $T_2$ to the second router. The second router receives $T_2$ (which now has a TTL value of 1), decrements the TTL value, and drops $T_2$ because $T_2$ then has a TTL value of zero. The second router then sends an error message (e.g., an ICMP response packet) back to the source. The error message includes the second router's IP address.

When $T_3$ (TTL=3) is sent, the first router receives $T_3$, decrements the TTL value, and forwards $T_3$ to the second router. The second router receives $T_3$ (which now has a TTL value of 2), decrements the TTL value, and forwards $T_3$ to the third router. The third router receives $T_3$ (which now has a TTL value of 1), decrements the TTL value, and drops $T_3$ because $T_3$ then has a TTL value of zero. The third router then sends an error message (e.g., an ICMP response packet) back to the source. The error message includes the third router's IP address.

Proceeding in this way, the traceroute client uses the returned error messages to build a list of routers that a packet having that same combination of routing parameters (e.g., the same 5-tuple) would follow as it travels across the network.

For a large and complex computer network, one aspect of network monitoring involves discovering the topology of the network. Traceroute packets may be used for this purpose. Because most computer networks use routers that support multipath routing techniques such as ECMP, it can be difficult to ensure that all paths between the source node and the destination node are detected. The NetSonar technique does not guarantee that all of the paths will be covered, but it does provide a mechanism for calculating how many groups of traceroute packets having different combinations of routing parameters should be sent between a source node and a destination node so that there is a reasonably high probability that a group of traceroute packets will travel across each of the paths between the source node and the destination node. Thus, the NetSonar technique makes it reasonably likely that all of the paths between the source node and the destination node will be detected.

The techniques disclosed herein may be used as part of a process of continuous network monitoring, in which network monitoring is performed on an ongoing basis. Thus, even after the topology of a network has been discovered, traceroute packets may continue to be sent for the purpose of continuing to monitor the network. One reason for continuing to monitor the network is to detect any failing components within the network. Another reason for continuing to monitor the network is to detect any changes to the network topology that may occur (e.g., additional paths that are created, existing paths that are taken down).

Generally speaking, the NetSonar technique provides a better balance of the competing goals identified above (the goal to have comprehensive testing, and the goal to minimize the burden on the computer network) than the black box techniques and white box techniques discussed previously. However, the number of traceroute packets that are sent as part of the NetSonar technique can still be quite burdensome to the network. The present disclosure is generally related to reducing the number of traceroute packets that are sent relative to the NetSonar technique (and other known gray box testing techniques) while still maintaining similar levels of comprehensiveness.

In the discussion that follows, various examples of computer networks that may be monitored in accordance with the techniques disclosed herein will be described. For the sake of clarity, the networks that are shown and described herein are relatively simple. However, those skilled in the art will recognize that the techniques disclosed herein may be applied to networks that are significantly more complex than those shown and described herein. The techniques disclosed herein may be used in connection with networks that include extremely large numbers (e.g., hundreds or even thousands) of network components (e.g., routers, switches). As an example, the techniques disclosed herein may be used in connection with networks that are used by cloud computing providers in order to provide cloud computing services. As another example, the techniques disclosed herein may be used in connection with large enterprise networks.

FIG. 1 illustrates an example of a network segment 100 that may be monitored in accordance with the techniques disclosed herein. In this context, the term "network segment" may refer to any portion of a computer network. The network segment 100 shown in FIG. 1 includes a source node 102, a destination node 104, and a plurality of intermediate nodes (abbreviated "IN") 106 between the source node 102 and the destination node 104. The source node 102 and the destination node 104 may be computing devices on the network, and the intermediate nodes 106 may be network components such as routers, switches, or the like.

In the network segment 100 that is shown in FIG. 1, there are six paths between the source node 102 and the destination node 104. These paths are identified in Table 1 shown immediately below.

| | |
|---|---|
| Path 1 | Source Node 102 → IN1 106a → IN2 106b → IN4 106d → IN5 106e → IN8 106h → IN10 106j → Destination Node 104 |
| Path 2 | Source Node 102 → IN1 106a → IN2 106b → IN4 106d → IN7 106g → IN10 106j → Destination Node 104 |
| Path 3 | Source Node 102 → IN1 106a → IN2 106b → IN4 106d → IN6 106f → IN9 106i → IN10 106j → Destination Node 104 |
| Path 4 | Source Node 102 → IN1 106a → IN3 106c → IN4 106d → IN5 106e → IN8 106h → IN10 106j → Destination Node 104 |
| Path 5 | Source Node 102 → IN1 106a → IN3 106c → IN4 106d → IN7 106g → IN10 106j → Destination Node 104 |
| Path 6 | Source Node 102 → IN1 106a → IN3 106c → IN4 106d → IN6 106f → IN9 106i → IN10 106j → Destination Node 104 |

Table 1

To perform network testing on the network segment 100 that is shown in FIG. 1, a gray box testing method like the NetSonar technique may be used to determine a probabilistic cover value. In an example, the term "probabilistic cover value" may refer to how many different groups of traceroute packets should be sent between two nodes (e.g., the source node 102 and the destination node 104) so that there is a reasonably high probability that at least one group of traceroute packets will travel across each of the paths between those nodes. As indicated above, the different groups of traceroute packets have different combinations of routing parameters (e.g., 5-tuples).

For example, if the probabilistic cover value is determined to be j (where j is a positive integer), this means that j different groups of traceroute packets should be sent from the source node 102 to the destination node 104. In this context, a single group of traceroute packets includes traceroute packets with the same routing parameters (e.g., the same 5-tuples) but different TTL values that are sent in the manner described above. Different groups of traceroute packets have different combinations of routing parameters (e.g., different 5-tuples).

As indicated above, the term "probabilistic cover value" may refer to how many different groups of traceroute packets should be sent between two nodes so that there is a reasonably high probability that at least one group of traceroute packets will travel across each of the paths between those nodes. In this context, the "reasonably high probability" may be a defined value. The specific value that is used may vary in different scenarios. The greater the desired probability that at least one group of traceroute packets will travel across each of the paths between two nodes, the higher the probabilistic cover value is.

Once a probabilistic cover value is determined and the traceroute packets are sent, results from sending those packets may be collected and analyzed to determine the paths between the source node 102 and the destination node 104. If, as the probabilities suggest, at least one group of traceroute packets travels across each of the paths between the source node 102 and the destination node 104, then the information obtained from sending the traceroute packets will provide information about each of those paths (e.g., information about the network nodes that are included in each of those paths, similar to what is provided in Table 1 above).

As noted previously, the techniques disclosed herein may be used as part of a process of continuous network monitoring. Thus, once different groups of traceroute packets (corresponding to the probabilistic cover value) are sent and the results from sending those traceroute packets are collected and analyzed, the process may be repeated. That is, additional groups of traceroute packets may be sent, and the results from sending those traceroute packets may be collected and analyzed. This process may be repeated indefinitely.

As noted previously, one aspect of network monitoring involves discovering the topology of the network. For example, referring to the network segment 100 shown in FIG. 1, sending traceroute packets and analyzing the results of the traceroute packets enables the paths between the source node 102 and the destination node 104 to be determined. Even after those paths are determined, traceroute packets may continue to be sent from the source node 102 to the destination node 104 for the purpose of continuing to monitor the network segment 100. For example, as indicated above, continuing to send traceroute packets allows any failing components to be detected. Continuing to send traceroute packets also allows any changes to the network topology to be detected.

As indicated above, the present disclosure is generally related to reducing the number of traceroute packets that are sent relative to known gray box testing techniques (such as the NetSonar technique) while still maintaining similar levels of comprehensiveness. To accomplish this, the information about the paths between the source node 102 and the destination node 104 may be analyzed to determine the presence of significant hops in the network segment 100. Those significant hops may then be leveraged to reduce the number of traceroute packets that are subsequently sent.

For example, suppose the probabilistic cover value is determined to be j for sending traceroute packets between the source node 102 and the destination node 104. In other words, suppose that a determination is made (based on the NetSonar method or some other gray box testing technique) that j different groups of traceroute packets with different combinations of routing parameters (e.g., different 5-tuples) should be sent from the source node 102 to the destination node 104 so that the probability of covering each of the paths between the source node 102 and the destination node 104 exceeds some minimum threshold level. By identifying at least one significant hop in the network segment 100, the number of traceroute packets that are subsequently sent can be reduced (i.e., fewer than j different groups of traceroute packets can be sent) without reducing the probability that all paths will be covered (or at least without significantly reducing that probability).

Generally speaking, the term "significant hop" can refer to any intermediate node 106 that is included in more than one path between the source node 102 and the destination node 104. (There are some exceptions to this, as will be discussed below.) Thus, the term "significant hop" can refer to a node. Alternatively, the term "significant node" or "significant intermediate node" may be used instead. The terms "significant hop," "significant node," and "significant intermediate node" may be used interchangeably herein. Generally speaking, the greater the number of paths in which a particular hop appears, the more significant that hop is. In the example shown in FIG. 1, the intermediate node IN4

106d appears in each of the paths between the source node 102 and the destination node 104. Therefore, IN4 106d is a significant hop in this example.

The intermediate nodes IN1 106a and IN10 106j are also included in each of the paths between the source node 102 and the destination node 104. However, because they are adjacent to the endpoints of the network segment 100 (IN1 106a is adjacent to the source node 102, and IN10 106j is adjacent to the destination node 104) they cannot be used to reduce the number traceroute packets that are sent.

The fact that IN4 106d is a significant hop can be leveraged to reduce the number of traceroute packets that are sent in subsequent testing cycles. To understand why, consider that the probabilistic cover value that is calculated for a network segment between two nodes depends on the number of paths that exist between those nodes. As the number of paths between two nodes increases, the probabilistic cover value also increases. Moreover, the rate of increase is generally not linear. For example, the probabilistic cover value for 2N paths is generally more than twice as high as the probabilistic cover value for N paths.

To determine the probabilistic cover value, several assumptions can be made. In particular, it can be assumed that each hop (e.g., each router) has N next-hops for a group of traceroute packets (where a group of traceroute packets has the same routing parameters, or 5-tuples, but different TTL values that are sent in the manner described above). It can also be assumed that each hop (e.g., each router) applies an unknown hash function to each group of traceroute packets (e.g., each 5-tuple), that each group of traceroute packets is hashed to a next-hop with a uniform probability of 1/N, and that each group of traceroute packets is treated by the hash function independently.

The probabilistic cover value (which, as indicated above, refers to how many different groups of traceroute packets that should be sent between two nodes so that there is a reasonably high probability that at least one group of traceroute packets will travel across each of the paths between those nodes) can be determined by an analogy to the coupon collector's problem in probability theory.

The coupon collector's problem can be stated as follows: Suppose that there are N different coupons, equally likely, from which coupons are being collected with replacement. What is the probability of collecting all N coupons in less than k trials?

By analogy, each next-hop can be seen as a different coupon, and each sending of a group of traceroute packets (with a specific 5-tuple) can be seen as being equivalent to drawing a coupon from the pool. If T designates the number of trials needed, the expectation can be calculated as follows:

$$\mathbb{E}(T) = N \sum_{i=1}^{N} \frac{1}{i} \sim O(N \log(N)) \quad (1)$$

In other words, it may be assumed that each router attempts to distribute the groups of traceroute packets that it receives uniformly to its N next hops. A determination may then be made regarding the number of different groups of traceroute packets (e.g., different 5-tuples) that should be sent to that router to cover all of its next hops, as the intention is to cover all. To cover all N next hops, the number of different groups of traceroute packets that are needed is of the order of N log(N). This is just for the next TTL value or one hop jump. For simplicity it may be assumed that all paths are like the next one hop jump from the router.

To leverage a significant hop like IN4 106d in order to reduce the number of traceroute packets that are sent, the portion of the network segment 100 between the source node 102 and the destination node 104 can be (logically) divided into two sections: a first section from the source node 102 to the significant hop IN4 106d, and a second section from IN4 106d to the destination node 104. The probabilistic cover value for the entire network segment 100 between the source node 102 and the destination node 104 exceeds the sum of (i) the probabilistic cover value for the first section of the network segment 100 between the source node 102 and IN4 106d, and (ii) the probabilistic cover value for the second section of the network segment 100 between IN4 106d and the destination node 104.

More specifically, there are six paths between the source node 102 and the destination node 104. There are two paths between the source node 102 and IN4 106d. There are three paths between IN4 106d and the destination node 104. The probabilistic cover value for six paths exceeds the sum of (i) the probabilistic cover value for two paths, and (ii) the probabilistic cover value for three paths. Therefore, if two distinct probabilistic cover values are calculated for two sections of the network segment 100 (one section from the source node 102 to IN4 106d, and another section from IN4 106d to the destination node 104), this will result in fewer traceroute packets being sent than if just one probabilistic cover value is calculated for the entire network segment 100 between the source node 102 and the destination node 104. It is the presence of the significant hop IN4 106d that makes it possible to divide the network segment 100 between the source node 102 and the destination node 104 into two sections, so that the number of traceroute packets can be reduced in this manner.

In other words, as indicated above, the network segment 100 includes a significant hop IN4 106d. There are two paths to reach IN4 106d from the source node 102. Therefore, j groups of traceroute packets having different combinations of routing parameters are generated, where the value of j is selected to cover both of these paths. It may then be determined (based on the previous iteration of traceroute packets) that the significant hop IN4 106d was found at a TTL value of 3, and there are three paths between the significant hop IN4 106d and the destination node 104. Therefore, k groups of traceroute packets having different combinations of routing parameters are generated, where the value of k is selected to cover all three of these paths. Moreover, the traceroute packets start with a TTL value of 3. This makes it possible to cover all of the paths with j+k groups of traceroute packets, which is less than the number of groups of traceroute packets that would be required to cover all six paths from the source node 102 to the destination node 104. Furthermore, having the second set of traceroute packets (i.e., the k groups of traceroute packets that are designed to cover the three paths between the significant hop IN4 106d and the destination node 104) start from a TTL value of 3 (instead of a TTL value of 1) further reduces the number of traceroute packets that are sent across the network segment 100. Accordingly, the techniques disclosed herein significantly reduce the burden on the network segment 100 from continuous monitoring.

Figure 2:
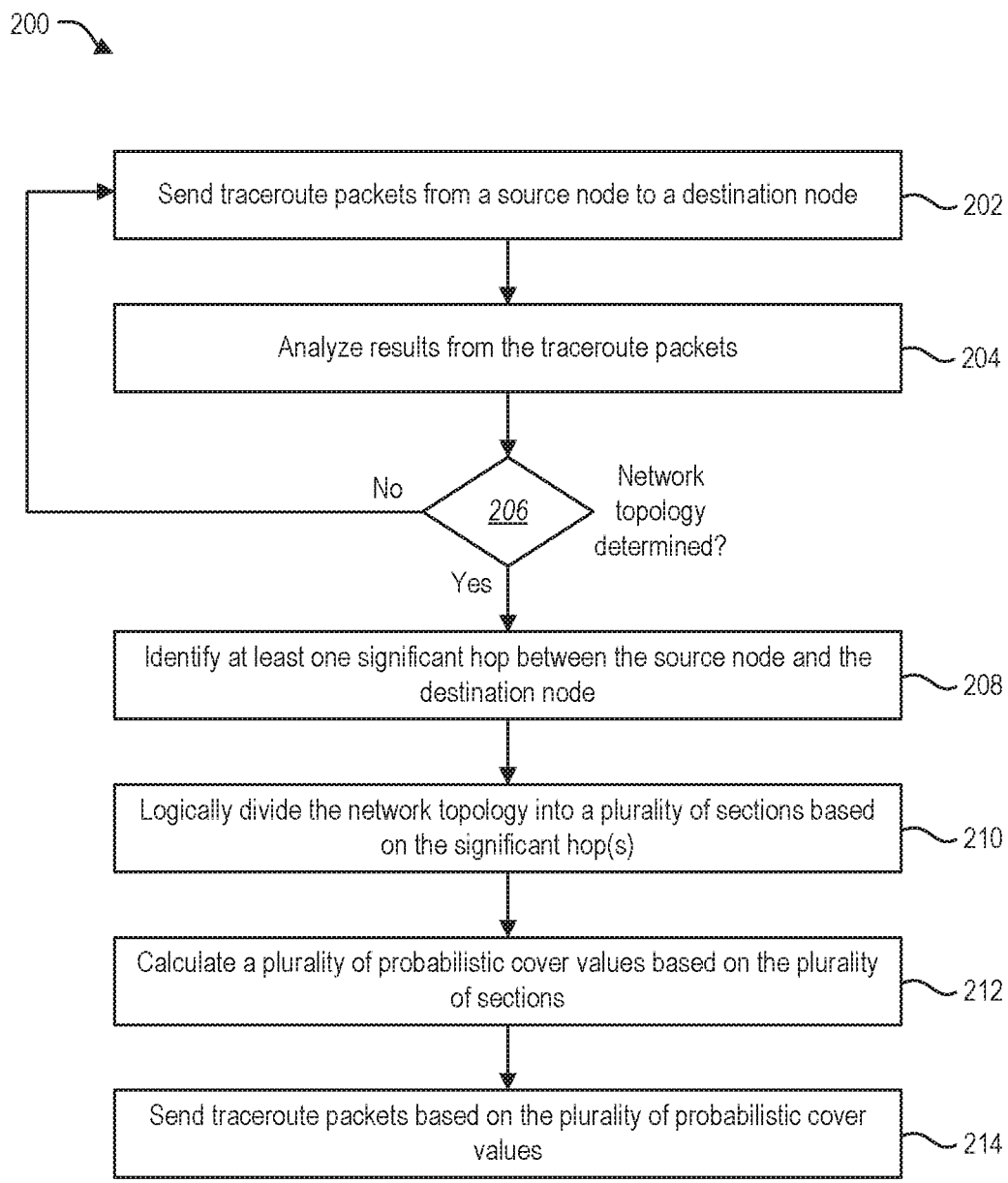
FIG. 2 illustrates an example of a method that may be performed in order to reduce the number of traceroute packets that are sent during continuous network monitoring.

FIG. 2 illustrates an example of a method 200 that may be performed in order to reduce the number of traceroute packets that are sent during continuous network monitoring. The method 200 will be described in relation to the network segment 100 that is shown in FIG. 1.

The method 200 includes sending 202 traceroute packets from the source node 102 to the destination node 104 and analyzing 204 results from those traceroute packets. Initially, the network topology between the source node 102 and the destination node 104 may be unknown. The actions of sending 202 traceroute packets and analyzing 204 results from those traceroute packets may be repeated until the network topology between the source node 102 and the destination node 104 has been determined 206 with some reasonable degree of probability.

As indicated above, for purposes of the method 200 it will be assumed that the network segment 100 is being continuously monitored. Therefore, even after the network topology between the source node 102 and the destination node 104 has been determined 206 with some reasonable degree of probability, traceroute packets continue to be sent as part of the continuous monitoring of the network segment 100. As discussed above, however, the number of traceroute packets that are sent can be reduced by identifying 208 one or more significant hops between the source node 102 and the destination node 104.

Once a significant hop has been identified 208, then the network segment 100 between the source node 102 and the destination node 104 can be logically divided 210 into a plurality of different sections based on that significant hop. The method 200 then involves calculating 212 a plurality of probabilistic cover values for the individual sections of the network segment 100 (as opposed to calculating a single probabilistic cover value for the entire network segment 100) and sending 214 a plurality of different sets of traceroute packets based on the plurality of probabilistic cover values. In this context, a "set" of traceroute packets includes a plurality of different groups of traceroute packets, where the number of different groups is determined based on a probabilistic cover value.

For instance, in the example shown in FIG. 1, IN4 106d may be identified 208 as a significant hop. The network segment 100 between the source node 102 and the destination node 104 can then be logically divided 210 into two sections: a first section between the source node 102 and IN4 106d, and a second section between IN4 106d and the destination node 104. Two probabilistic cover values may then be calculated 212: a first probabilistic cover value for the first section of the network segment 100 between the source node 102 and IN4 106d (which includes two paths), and a second probabilistic cover value for the second section of the network segment 100 between IN4 106d and the destination node 104 (which includes three paths).

Traceroute packets can then be sent 214 based on those probabilistic cover values. In the example shown in FIG. 1, two different sets of traceroute packets can be sent 214. In this context, the term "set of traceroute packets" may refer to one or more groups of traceroute packets. The term "group of traceroute packets" may refer to traceroute packets with the same routing parameters (e.g., the same 5-tuples) but different TTL values that are sent in the manner described above.

If it is assumed that the first probabilistic cover value is x and the second probabilistic cover value is y, then the first set of traceroute packets would include x different groups of traceroute packets (e.g., x different 5-tuples) and the second set of traceroute packets would include y different groups of traceroute packets (e.g., y different 5-tuples). All of the groups of traceroute packets in the first set would start from a TTL value corresponding to the source node 102 (e.g., a TTL value of 1, as is typically the case with traceroute packets). However, all of the groups of traceroute packets in the second set would start from a TTL value corresponding to the significant hop. In the example shown in FIG. 1, IN4 106d is the significant hop, and it corresponds to a TTL value of 3. In other words, 3 is the minimum TTL value for a traceroute packet that would reach IN4 106d. Therefore, in this example, all of the groups of traceroute packets in the second set would start from a TTL value of 3.

The actions just described (i.e., identifying 208 one or more significant hops between the source node 102 and the destination node 104, logically dividing 210 the network segment 100 into a plurality of different sections based on the significant hop(s), calculating 212 a plurality of probabilistic cover values for the individual sections of the network segment 100, and sending 214 a plurality of different sets of traceroute packets based on the plurality of probabilistic cover values) generally result in fewer traceroute packets being sent than if traceroute packets are sent based only on a single probabilistic cover value for the entire network segment 100.

Figure 3:
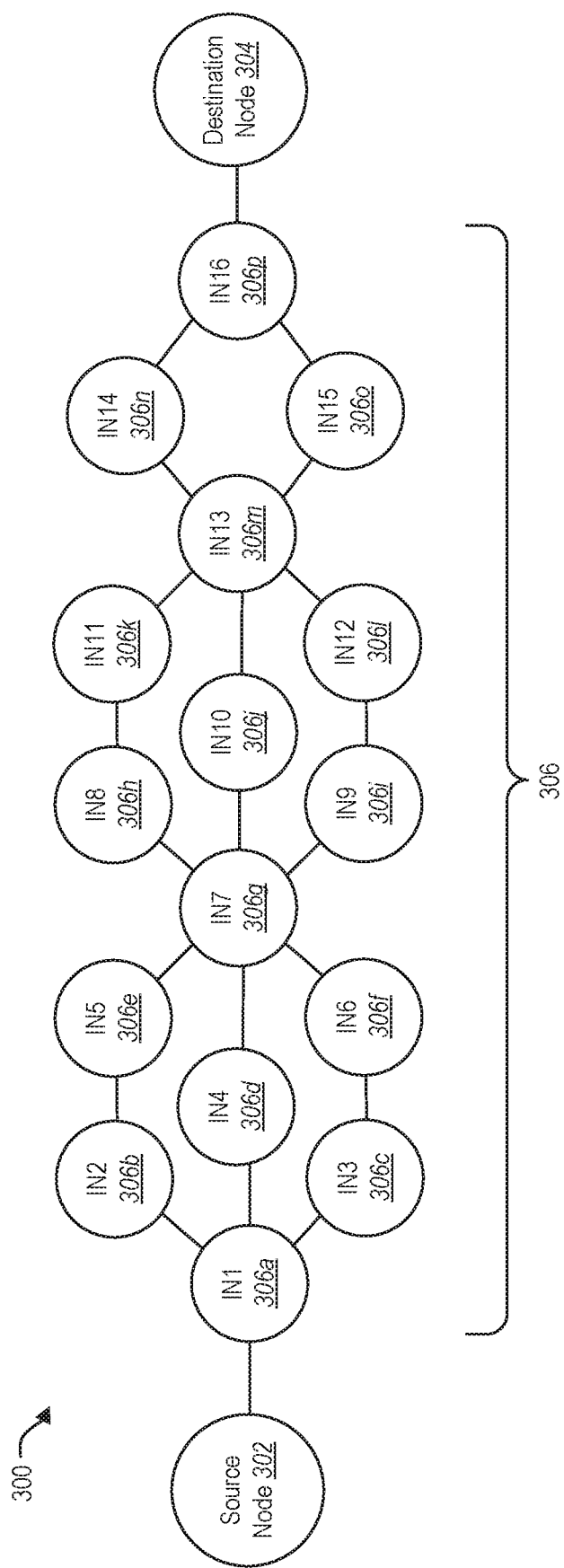
FIG. 3 illustrates another example of a network segment that may be monitored in accordance with the techniques disclosed herein.

FIG. 3 illustrates another example of a network segment 300 that may be monitored in accordance with the techniques disclosed herein. Like the network segment 100 shown in FIG. 1, the network segment 300 includes a source node 302, a destination node 304, and a plurality of intermediate nodes (abbreviated "IN") 306 between the source node 302 and the destination node 304. As before, the source node 302 and the destination node 304 may be computing devices on the network, and the intermediate nodes 306 may be network components such as routers, switches, or the like.

In the network segment 300 that is shown in FIG. 3, there are eighteen paths between the source node 302 and the destination node 304. These paths are identified in Table 2 shown immediately below.

| | |
|---|---|
| Path 1 | Source Node 302 → IN1 306a → IN2 306b → IN5 306e → IN7 306g → IN8 306h → IN11 306k → IN13 306m → IN14 306n → IN16 306p → Destination Node 304 |
| Path 2 | Source Node 302 → IN1 306a → IN2 306b → IN5 306e → IN7 306g → IN8 306h → IN11 306k → IN13 306m → IN15 306o → IN16 306p → Destination Node 304 |
| Path 3 | Source Node 302 → IN1 306a → IN2 306b → IN5 306e → IN7 306g → IN10 306j → IN13 306m → IN14 306n → IN16 306p → Destination Node 304 |
| Path 4 | Source Node 302 → IN1 306a → IN2 306b → IN5 306e → IN7 306g → IN10 306j → IN13 306m → IN15 306o → IN16 306p → Destination Node 304 |
| Path 5 | Source Node 302 → IN1 306a → IN2 306b → IN5 306e → IN7 306g → IN9 306i → IN12 3061 → IN13 306m → IN14 306n → IN16 306p → Destination Node 304 |
| Path 6 | Source Node 302 → IN1 306a → IN2 306b → IN5 306e → IN7 306g → IN9 306i → IN12 3061 → IN13 306m → IN15 306o → IN16 306p → Destination Node 304 |
| Path 7 | Source Node 302 → IN1 306a → IN4 306d → IN7 306g → IN8 306h → IN11 306k → IN13 306m → IN14 306n → IN16 306p → Destination Node 304 |
| Path 8 | Source Node 302 → IN1 306a → IN4 306d → IN7 306g → IN8 306h → IN11 306k → IN13 306m → IN15 306o → IN16 306p → Destination Node 304 |
| Path 9 | Source Node 302 → IN1 306a → IN4 306d → IN7 306g → IN10 306j IN13 306m → IN14 306n → IN16 306p → Destination Node 304 |
| Path 10 | Source Node 302 → IN1 306a → IN4 306d → IN7 306g → IN10 306j IN13 306m → IN15 306o → IN16 306p → Destination Node 304 |
| Path 11 | Source Node 302 → IN1 306a → IN4 306d → IN7 306g → IN9 306i → IN12 3061 → IN13 306m → IN14 306n → IN16 306p → Destination Node 304 |
| Path 12 | Source Node 302 → IN1 306a → IN4 306d → IN7 306g → IN9 306i → IN12 3061 → IN13 306m → IN15 306o → IN16 306p → Destination Node 304 |

-continued

| | |
|---|---|
| Path 13 | Source Node 302 → IN1 306a → IN3 306c → IN6 306f → IN7 306g → IN8 306h → IN11 306k → IN13 306m → IN14 306n → IN16 306p → Destination Node 304 |
| Path 14 | Source Node 302 → IN1 306a → IN3 306c → IN6 306f → IN7 306g → IN8 306h → IN11 306k → IN13 306m → IN15 306o → IN16 306p → Destination Node 304 |
| Path 15 | Source Node 302 → IN1 306a → IN3 306c → IN6 306f → IN7 306g → IN10 306j → IN13 306m → IN14 306n → IN16 306p → Destination Node 304 |
| Path 16 | Source Node 302 → IN1 306a → IN3 306c → IN6 306f → IN7 306g → IN10 306j → IN13 306m → IN15 306o → IN16 306p → Destination Node 304 |
| Path 17 | Source Node 302 → IN1 306a → IN3 306c → IN6 306f → IN7 306g → IN9 306i → IN12 306l → IN13 306m → IN14 306n → IN16 306p → Destination Node 304 |
| Path 18 | Source Node 302 → IN1 306a → IN3 306c → IN6 306f → IN7 306g → IN9 306i → IN12 306l → IN13 306m → IN15 306o → IN16 306p → Destination Node 304 |

As indicated above, information about the paths between the source node 302 and the destination node 304 may be analyzed to determine the presence of significant hops in the network segment 300. In the example shown in FIG. 3, the intermediate nodes IN7 306g and IN13 306m appear in each of the paths between the source node 302 and the destination node 304. Therefore, IN7 306g and IN13 306m are significant hops in this example.

Figure 4:
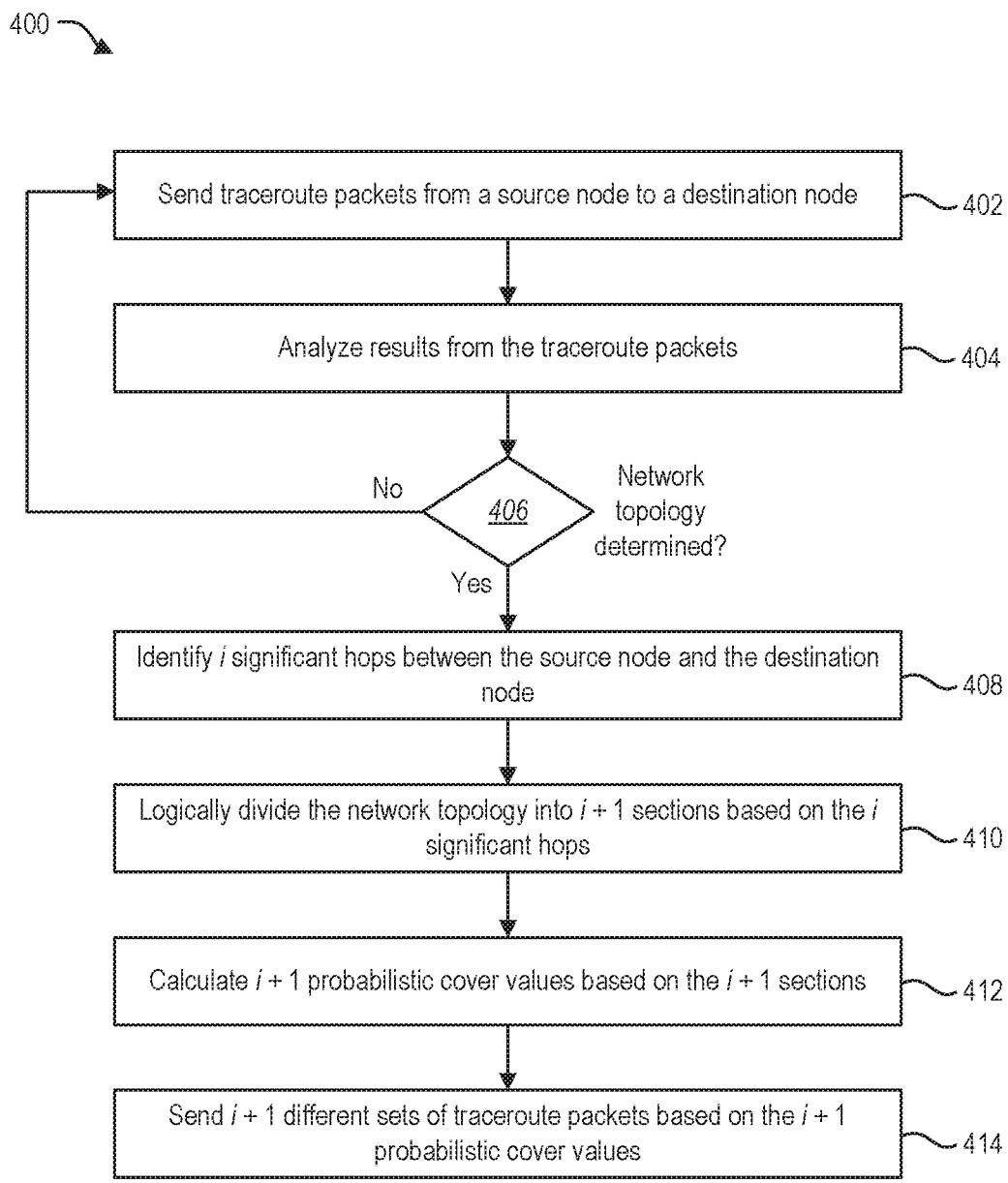
FIG. 4 illustrates another example of a method that may be performed in order to reduce the number of traceroute packets that are sent during continuous network monitoring, in which multiple significant hops are identified and each significant hop is used to reduce traceroute packets.
Figure 5:
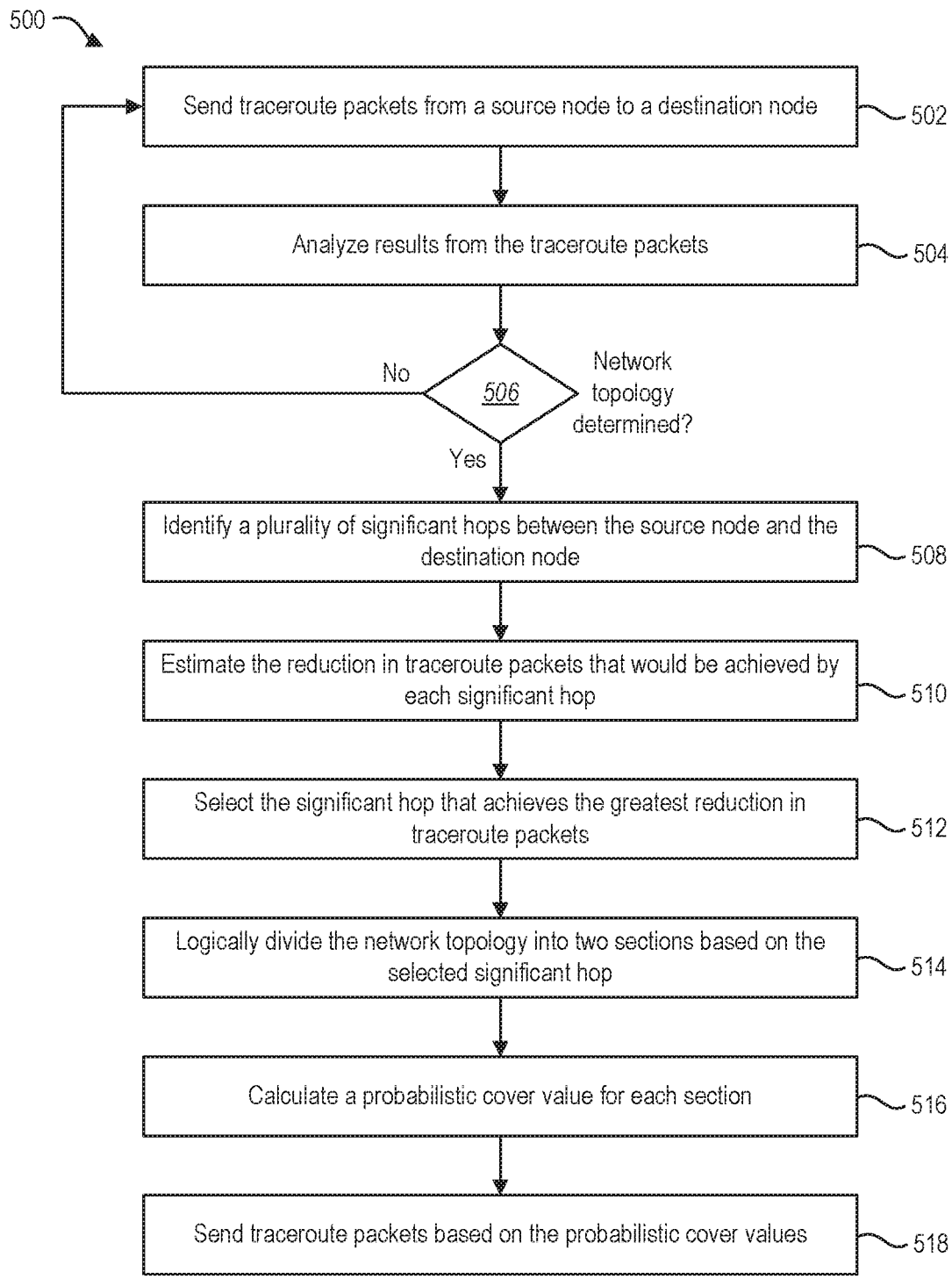
FIG. 5 illustrates another example of a method that may be performed in order to reduce the number of traceroute packets that are sent during continuous network monitoring, in which multiple significant hops are identified and only one of the significant hops is used to reduce traceroute packets.

As indicated above, the presence of significant hops in a network segment makes it possible to reduce the number of traceroute packets that are sent during continuous network monitoring. When multiple significant hops are identified in a network segment (as in the example shown in FIG. 3), there are at least two different ways that those significant hops may be used to reduce traceroute packets. With a first approach, each significant hop is used to reduce traceroute packets. With a second approach, only one of the significant hops is used to reduce traceroute packets. FIG. 4 illustrates an example of a method 400 that uses the first approach. FIG. 5 illustrates an example of a method 500 that uses the second approach.

The method 400 shown in FIG. 4 will be discussed first. The method 400 will be described in relation to the network segment 300 shown in FIG. 3. The method 400 includes sending 402 traceroute packets from the source node 302 to the destination node 304 and analyzing 404 results from those traceroute packets in order to determine 406 the network topology between the source node 302 and the destination node 304 with some reasonable degree of probability. These actions are similar to the corresponding actions 202, 204, 206 that were described above in connection with the method 200 shown in FIG. 2.

As discussed above, the techniques disclosed herein may be used as part of a process of continuous network monitoring. Therefore, once the network topology between the source node 302 and the destination node 304 has been determined 406 with some reasonable degree of probability, traceroute packets continue to be sent as part of the continuous monitoring of the network segment 300. As also discussed above, however, the number of traceroute packets that are sent can be reduced by identifying one or more significant hops between the source node 302 and the destination node 304. In the method 400 shown in FIG. 4, it will be assumed that a plurality of significant hops are identified 408 in the network segment 300. The number of significant hops that are identified will be represented by the variable i. In the context of this method 400, the value of i can be any positive integer that is greater than or equal to two.

Once a plurality of significant hops have been identified 408, then the network segment 300 between the source node 302 and the destination node 304 can be logically divided 410 into a plurality of different sections based on the plurality of significant hops. More specifically, if i significant hops are identified in a particular network segment, then that network segment can be logically divided into i+1 sections. In the example shown in FIG. 3, two significant hops are identified: IN7 306g and IN13 306m (in other words, i=2). The network segment 300 can therefore be logically divided into three sections: a first section from the source node 302 to the first significant hop (IN7 306g), a second section from the first significant hop (IN7 306g) to the second significant hop (IN13 306m), and a third section from the second significant hop (IN13 306m) to the destination node 304. The first section of the network segment 300 includes three potential paths, the second section of the network segment 300 also includes three potential paths, and the third section of the network segment 300 includes two potential paths.

The method 400 then involves calculating 412 a plurality of probabilistic cover values for the different sections of the network segment 300. More specifically, if i significant hops are identified in a particular network segment, then i+1 probabilistic cover values may be calculated for that network segment. As noted above, two significant hops (IN7 306g and IN13 306m) are identified in the example shown in FIG. 3 (i=2). Therefore, three probabilistic cover values may be calculated 412: a first probabilistic cover value for the first section of the network segment 300 between the source node 302 and the first significant hop (IN7 306g), a second probabilistic cover value for the second section of the network segment 300 between the first significant hop (IN7 306g) and the second significant hop (IN13 106m), and a third probabilistic cover value for the third section of the network segment 300 between the second significant hop (IN13 306m) and the destination node 304.

Traceroute packets can then be sent 414 based on those i+1 probabilistic cover values. In the example shown in FIG. 3, three different sets of traceroute packets can be sent 414 based on the three probabilistic cover values that are calculated. Suppose that the first probabilistic cover value is x, the second probabilistic cover value is y, and the third probabilistic cover value is z. In this case, the first set of traceroute packets can include x different groups of traceroute packets (e.g., x different 5-tuples), the second set of traceroute packets can include y different groups of traceroute packets (e.g., y different 5-tuples), and the third set of traceroute packets can include z different groups of traceroute packets (e.g., z different 5-tuples).

The groups of traceroute packets in the first set can start from a TTL value corresponding to the source node 302 (e.g., a TTL value of 1). The groups of traceroute packets in the second set can start from a TTL value that corresponds to the first significant hop. In the example shown in FIG. 3, IN7 306g is the first significant hop, and it corresponds to a TTL value of either 3 or 4. (There are some paths where 3 is the minimum TTL value for a traceroute packet that would reach IN7 306g, and there are other paths where 4 is the minimum TTL value for a traceroute packet that would reach IN7 306g.) Where there are multiple TTL values to choose from, selecting the lower TTL value increases the probability that all paths will be covered. Therefore, in this example, the groups of traceroute packets in the second set can start from a TTL value of 3. The groups of traceroute packets in the third set can start from a TTL value that corresponds to the second significant hop. In the example shown in FIG. 3, IN13 306m is the second significant hop, and it corresponds to a TTL value of either 5 or 7. (There are some paths where 5 is the minimum TTL value for a traceroute packet that would reach IN13 306m, and there are other paths where 7 is the minimum TTL value for a traceroute packet that would reach IN13 306m.) Therefore, in this example, the groups of traceroute packets in the third set can start from a TTL value of 5.

FIG. 5 illustrates an example of a method 500 in which a plurality of significant hops are identified in a network segment and only one of the significant hops is used to reduce traceroute packets. The method 500 will be described in relation to the network segment 300 shown in FIG. 3. The method 500 includes sending 502 traceroute packets from the source node 302 to the destination node 304 and analyzing 504 results from those traceroute packets in order to determine 506 the network topology between the source node 302 and the destination node 304 with some reasonable degree of probability. These actions are similar to the corresponding actions 202, 204, 206 that were described above in connection with the method 200 shown in FIG. 2.

Once the network topology between the source node 302 and the destination node 304 has been determined 506 with some reasonable degree of probability, traceroute packets continue to be sent as part of the continuous monitoring of the network segment 300. As discussed above, the number of traceroute packets that are sent can be reduced by identifying one or more significant hops between the source node 302 and the destination node 304. In the method 500 shown in FIG. 5, it will be assumed that a plurality of significant hops are identified 508 in the network segment 300. However, in this method 500, only one of the significant hops is used to reduce traceroute packets.

To determine which of the significant hops is going to be used to reduce traceroute packets, the method 500 includes estimating 510 the reduction in traceroute packets that would be achieved by each significant hop. As noted above, two significant hops (IN7 306g and IN13 306m) are identified in the example shown in FIG. 3. Thus, if the method 500 is performed with respect to the network segment 300 shown in FIG. 3, the method 500 could include estimating 510 the reduction in traceroute packets that would be achieved by using IN7 306g as a significant hop, and also estimating 510 the reduction in traceroute packets that would be achieved by using IN13 306m as a significant hop. This could produce (at least) two estimates: one estimate corresponding to a scenario in which IN7 306g is used as a significant hop, and another estimate corresponding to a scenario in which IN13 306m is used as a significant hop. In this context, the term "estimate" may refer to a calculation (either an exact calculation or a rough calculation) of the reduction in traceroute packets that is achieved in accordance with a particular scenario.

The significant hop that achieves the greatest reduction in traceroute packets would be selected 512. The method 500 would then include logically dividing 514 the network topology into two sections based on the selected significant hop, calculating 516 two probabilistic cover values (one for each section), and sending 518 traceroute packets based on the probabilistic cover values.

Figure 6:
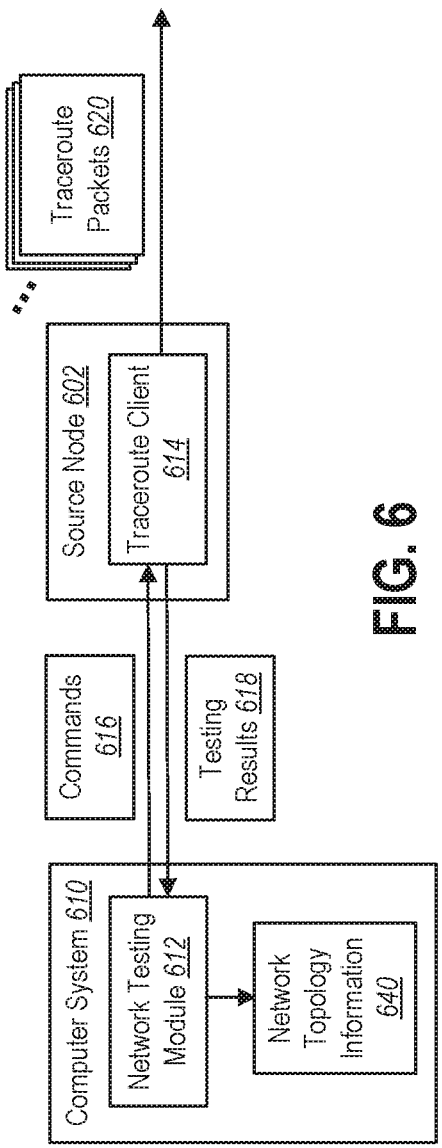
FIG. 6 illustrates an example of a system in which the disclosed techniques may be utilized, in which a source node is in electronic communication with a computer system that may be used for the purpose of configuring the source node to send traceroute packets.

FIG. 6 illustrates a source node 602 in electronic communication with a computer system 610 that may be used for the purpose of configuring the source node 602 to send traceroute packets. The source node 602 belongs to a computer network, and the computer system 610 may be operated by one or more individuals who are responsible for continuously monitoring that network. The computer system 610 is shown with a network testing module 612, which may be a software program that is configured to cause the source node 602 (and other source nodes in the computer system) to send traceroute packets 620. The source node 602 is shown with a traceroute client 614 that is configured to send traceroute packets 620. The traceroute packets 620 are addressed to a destination node (not shown in FIG. 6).

The network testing module 612 may be configured to implement any of the network testing methods described herein (e.g., the methods 200, 400, 500 shown in FIGS. 2, 4, and 5). FIG. 6 shows the network testing module 612 sending commands 616 to the source node 602. The commands 616 may be structured to cause the traceroute client 614 on the source node 602 to send traceroute packets 620. The commands 616 may include instructions regarding how many different sets of traceroute packets 620 should be sent by the traceroute client 614, and how many groups of traceroute packets should be included in each set. FIG. 6 also shows the source node 602 providing testing results 618 to the network testing module 612. The network testing module 612 may analyze the testing results 618. For example, the network testing module 612 may determine the network topology between the source node 602 and the destination node based on the testing results 618. Based on its analysis of the testing results 618, the network testing module 612 may send additional commands 616 to the source node 602. This process may continue indefinitely in order to facilitate continuous network testing.

As described above, the number of traceroute packets 620 that are sent as part of continuous network testing can be reduced by identifying one or more significant hops between the source node 602 and the destination node. The network testing module 612 may analyze the testing results 618 in order to identify one or more significant hops. The network testing module 612 instructs the source node 602 to send different sets of traceroute packets 620 based on the number of significant hops that are identified.

The network testing module 612 may determine network topology information 640 based on analyzing the testing results 618. In this context, the term "network topology information" may refer to any information about one or more network segments. More specifically, for a particular network segment between a source node and a destination node, network topology information may include information about one or more potential paths that a packet sent from the source node may travel on its way to reaching the destination node.

In the depicted example, the network topology information 640 may be based on testing results 618 from previous traceroute packets that have been sent. The network topology information 640 may be similar to the information that is included above in Table 1 and Table 2. In the network topology information 640, network nodes may be identified by their IP addresses. As indicated above, a significant hop can include any intermediate node that is included in more than one path between the source node and the destination node (except for network nodes that are adjacent to endpoints of the network segment). Therefore, the process of identifying significant hops in a network segment may include identifying IP addresses that appear more than once in the network topology information 640 in connection with the same network segment.

Figure 6A:
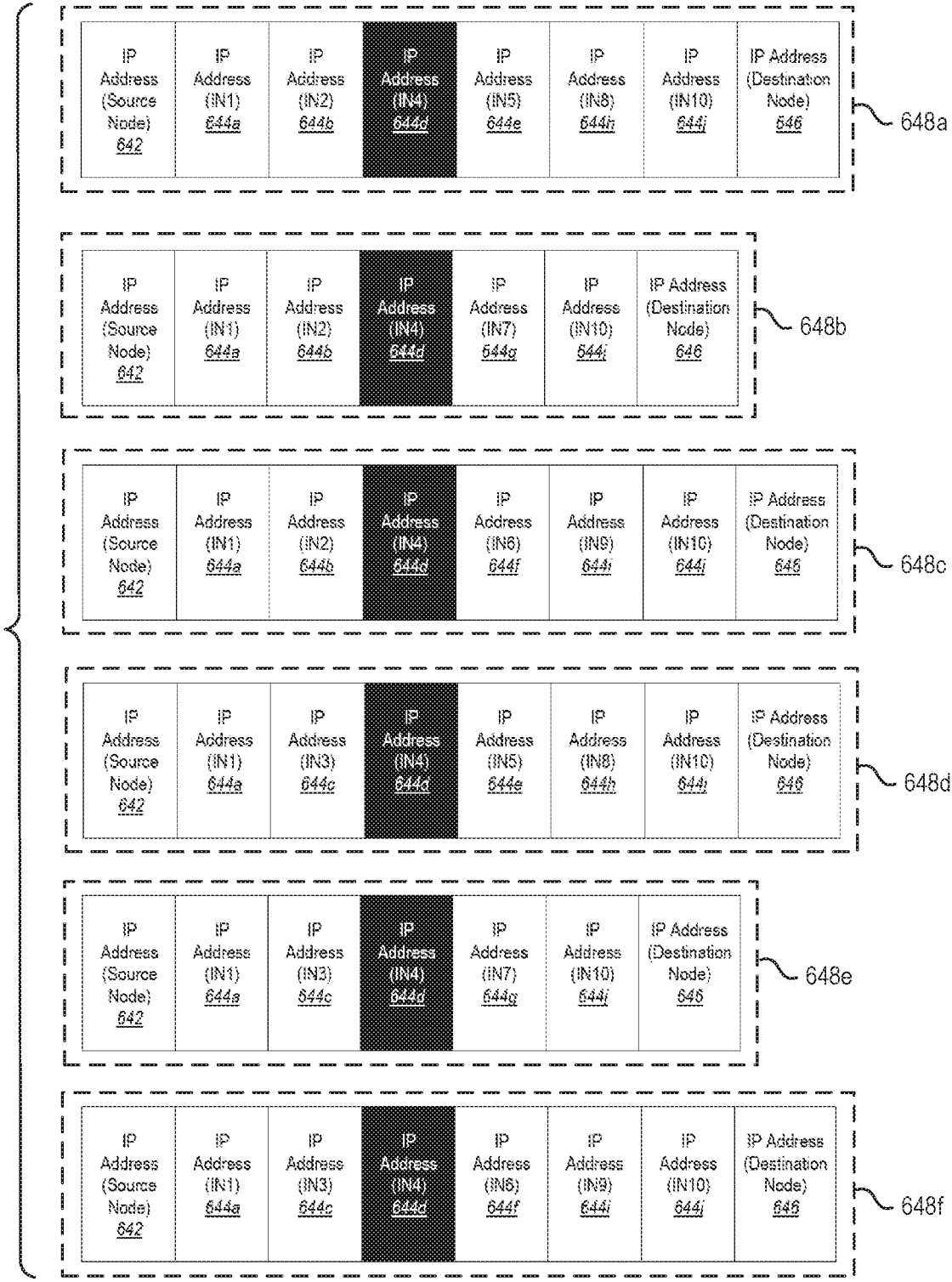
FIG. 6A illustrates an example of network topology information that may be generated based on traceroute packets that are sent across the network segment in the example shown in FIG. 1.

FIG. 6A illustrates an example of network topology information 640A that may be generated based on traceroute packets that are sent across the network segment 100 in the example shown in FIG. 1. The network topology information 640A includes IP addresses that are received from network nodes (e.g., routers) in response to sending traceroute packets. The network topology information 640A includes different sets 648a-f of information corresponding to different groups of traceroute packets that are sent.

As indicated above, a group of traceroute packets includes traceroute packets with the same routing parameters (e.g., the same 5-tuples) but increasing TTL values. A group of traceroute packets travels along a particular path in a network segment between a source node and a destination node. The network nodes (e.g., routers) send their IP addresses (and the packet's routing parameters) back to the source node when the TTL values of particular traceroute packets reach zero, as discussed above. The source node is able to use the information that it receives to determine the paths that the various groups of traceroute packets traveled.

Each set 648 of information corresponds to a particular path that is traveled by a group of traceroute packets and includes the IP addresses of the network nodes in that path. For example, the first set 648a of information corresponds to the first path in Table 1 above. Therefore, the first set 648a of information includes the IP address 642 of the source node 102, the IP address 644a of the intermediate node IN1 106a, the IP address 644b of the intermediate node IN2 106b, the IP address 644d of the intermediate node IN4 106d, the IP address 644e of the intermediate node IN5 106e, the IP address 644h of the intermediate node IN8 106h, the IP address 644j of the intermediate node IN10 106j, and the IP address 646 of the destination node 104. The other sets 648b-f of information correspond to the other paths in Table 1.

The various sets 648a-f of information may be analyzed (e.g., by the network testing module 612) to determine significant hops in a network segment between a source node and a destination node. As indicated above, a significant hop may be any intermediate node that is included in more than one path between the source node and the destination node. In the network topology information 640A shown in FIG. 6A (which corresponds to the example shown in FIG. 1), the IP address 644d of the intermediate node IN4 106d appears in each of the sets 648a-f of information. Therefore, IN4 106d is a significant hop in this example.

Other IP addresses are included in more than one set 648 of information (i.e., more than one path) in the depicted example and may also be considered to be significant hops. For example, the IP address 644b of IN2 306b is included in three sets 648a-c of information (corresponding to three different paths). Generally speaking, however, the greater the number of paths in which a particular IP address appears, the greater the reduction in traceroute packets that can be achieved by using the corresponding network node as a significant hop.

Figure 7:
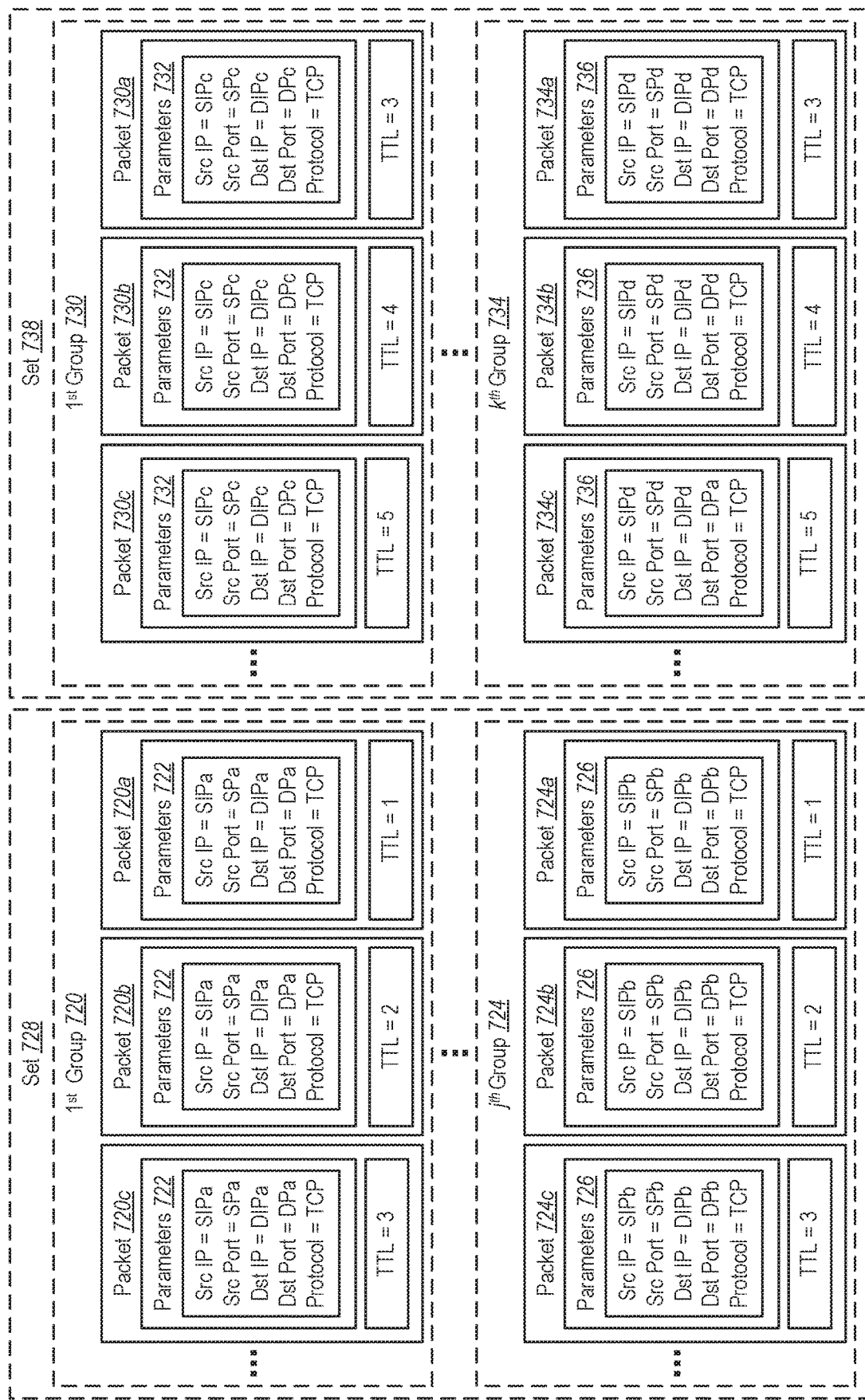
FIG. 7 illustrates an example showing different sets of traceroute packets that may be sent by a source node.

FIG. 7 illustrates an example showing two different sets 728, 738 of traceroute packets that may be sent by a source node. In the depicted example, the first set 728 of traceroute packets includes j different groups of traceroute packets. The first group 720 and the $j^{th}$ group 724 are shown in FIG. 7. The second set 738 of traceroute packets includes k different groups of traceroute packets. The first group 730 and the $k^{th}$ group 734 are shown in FIG. 7.

The packets within a particular group of traceroute packets have the same combination of routing parameters (e.g., the same 5-tuples) and increasing TTL values. For example, the packets 720a-c within the first group 720 have the same combination of routing parameters 722. For purposes of example, the routing parameters 722 are shown as SIPa (representing the source IP address), SPa (representing the source port), DIPa (representing the destination IP address), DPa (representing the destination port), and TCP (representing the protocol being used). The first traceroute packet 720a in the group 720 has a TTL value of 1, the second traceroute packet 720b in the group 720 has a TTL value of 2, the third traceroute packet 720c in the group 720 has a TTL value of 3, and so forth.

The different groups within a set have different combinations of routing parameters. For example, the packets 720a-c within the first group 720 have one combination of routing parameters 722 (described above), while the packets 724a-c within the $j^{th}$ group 724 have a different combination of routing parameters 726. For purposes of example, the routing parameters 726 in the $j^{th}$ group 724 are shown as SIPb (representing another source IP address that is different from SIPa), SPb (representing another source port that is different from SPa), DIPb (representing another destination IP address that is different from DIPa), DPb (representing another destination port that is different from DPa), and TCP (representing the protocol being used).

Similarly, the different groups of traceroute packets in the second set 738 also have different combinations of routing parameters. For purposes of example, the routing parameters 732 in the first group 730 are shown as SIPc (representing another source IP address that is different from SIPa and SIPb), SPc (representing another source port that is different from SPa and SPb), DIPc (representing another destination IP address that is different from DIPa and DIPb), DPc (representing another destination port that is different from DPa and DPb), and TCP (representing the protocol being used). The routing parameters 736 in the $k^{th}$ group 730 are shown as SIPd (representing another source IP address that is different from SIPa, SIPb, and SIPc), SPd (representing another source port that is different from SPa, SPb, and SPc), DIPd (representing another destination IP address that is different from DIPa, DIPb, and DIPc), DPd (representing another destination port that is different from DPa, DPb, and DPc), and TCP (representing the protocol being used).

The different groups of traceroute packets within a set start from the same TTL value. For example, the groups 720, 724 of traceroute packets in the first set 728 each start with a TTL value of 1. More specifically, the first packet 720a in the first group 720 and the first packet 724a in the $j^{th}$ group 724 have a TTL value of 1, and subsequent packets in those groups 720, 724 have increasing TTL values. As another example, the groups 730, 734 of traceroute packets in the second set 738 each start with a TTL value of 3. More specifically, the first packet 730a in the first group 730 and the first packet 734a in the $k^{th}$ group 734 have a TTL value of 3, and subsequent packets in those groups 730, 734 have increasing TTL values.

There are two different sets 728, 738 of traceroute packets in the depicted example. Two different sets 728, 738 of traceroute packets may be sent in a scenario where one significant hop has been identified. As indicated above, if i significant hops are identified in a particular network segment, then that network segment can be logically divided into i+1 sections, and i+1 sets of traceroute packets can be sent.

As also indicated above, if i significant hops are identified in a particular network segment, then i+1 probabilistic cover values may be calculated for that network segment. If i=1, as in the present example, then two probabilistic cover values may be calculated. The probabilistic cover values indicate how many different groups of traceroute packets (with different combinations of routing parameters) should be included in the sets of traceroute packets that are sent. If the probabilistic cover values are j and k, this means that the first set 728 of traceroute packets should include at least j different groups of traceroute packets (with j different combinations of routing parameters), and the second set 738 of traceroute packets should include at least k different groups of traceroute packets (with k different combinations of routing parameters).

The probabilistic cover values may be calculated based on the number of potential paths between different locations in the network segment. Continuing with the previous example in which one significant hop is identified and two probabilistic cover values (j and k) are calculated, the first probabilistic cover value j may be calculated based on the number of potential paths between the source node and the significant hop. The second probabilistic cover value k may be calculated based on the number of potential paths between the significant hop and the destination node.

In an example in which two significant hops are identified and three probabilistic cover values (x, y, and z) are calculated, the first probabilistic cover value x may be calculated based on the number of potential paths between the source node and the first significant hop. The second probabilistic cover value y may be calculated based on the number of potential paths between the first significant hop and the second significant hop. The third probabilistic cover value z may be calculated based on the number of potential paths between the second significant hop and the destination node.

More generally, in accordance with the techniques disclosed herein, a plurality of different probabilistic cover values may be calculated in response to identifying one or more significant hops in a network segment. The plurality of different probabilistic cover values may include a probabilistic cover value that is calculated based on the number of potential paths between the source node and a significant hop. The plurality of different probabilistic cover values may also include a probabilistic cover value that is calculated based on the number of potential paths between a significant hop and a subsequent node, where the subsequent node may be the destination node or another significant hop.

To increase the probability that all potential paths between the source node and the destination node are covered, the number of groups of traceroute packets (with different combinations of routing parameters) may exceed the probabilistic cover values. For example, if one significant hop is identified and two probabilistic cover values (j and k) are computed, the first set 728 of traceroute packets could include more than j different groups of traceroute packets, and the second set 738 of traceroute packets could include more than k different groups of traceroute packets.

The groups 720, 724 of traceroute packets in the first set 728 each start with a TTL value of 1 (which is the typical starting value for traceroute packets). The groups 730, 734 of traceroute packets in the second set 738 each start with a TTL value that corresponds to the significant hop. In other words, the groups 730, 734 of traceroute packets in the second set 738 each start with the minimum TTL value that causes the traceroute packets to reach the significant hop. For purposes of example, the groups 730, 734 of traceroute packets in the second set 738 each start with a TTL value of 3. This means that, when all potential paths between the source node and the destination node are considered, the shortest distance between the source node and the significant hop is 3 hops (as in the example shown in FIG. 3).

Figure 8:
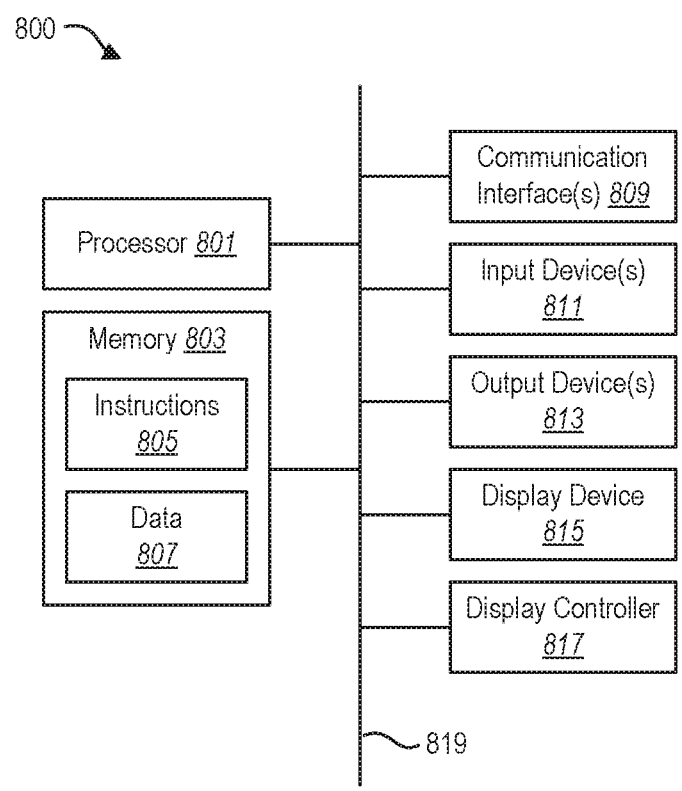
FIG. 8 illustrates certain components that may be included within a computing system.

One or more computing systems may be used to implement the optimization techniques disclosed herein. FIG. 8 illustrates certain components that may be included within a computing system 800.

The computing system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computing system 800 of FIG. 8, in an alternative configuration, a combination of processors (e.g., an ARM and DSP) could be used.

The computing system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor 801, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the methods, steps, operations, actions, or other functionality that is disclosed herein. Executing the instructions 805 may involve the use of the data 807 that is stored in the memory 803. Unless otherwise specified, any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

The computing system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing system 800 may also include one or more input devices 811 and one or more output devices 813. Some examples of input devices 811 include a keyboard, mouse, microphone, remote control device, button, joystick, trackball, touchpad, and lightpen. One specific type of output device 813 that is typically included in a computing system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815. The computing system 800 may also include other types of output devices 813, such as a speaker, a printer, etc.

The various components of the computing system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method, comprising:
receiving network topology information about a network segment between a source node and a destination node;
identifying, based on the network topology information, a significant intermediate node in the network segment, wherein the significant intermediate node is included in a plurality of paths between the source node and the destination node;
determining a first plurality of potential paths from the source node to the significant intermediate node;
calculating a first probabilistic cover value based on the first plurality of potential paths, wherein the first probabilistic cover value identifies a first set of traceroute packets that should be sent between the source node and the significant intermediate node to achieve a first desired probability that each of the first plurality of potential paths from the source node to the significant intermediate node will be traveled by at least one set of traceroute packets;
causing the first set of traceroute packets to be sent from the source node, the first set of traceroute packets being based on the first probabilistic cover value;
determining a second plurality of potential paths from the significant intermediate node to a subsequent node;
calculating a second probabilistic cover value based on the second plurality of potential paths, wherein the second probabilistic cover value identifies a second set of traceroute packets that should be sent between the significant intermediate node and the subsequent node to achieve a second desired probability that each of the second plurality of potential paths from the significant intermediate node to the subsequent node will be traveled by at least one set of traceroute packets; and
causing the second set of traceroute packets to be sent from the source node, the second set of traceroute packets being based on the second probabilistic cover value.

2. The method of claim 1, wherein:
the first set of traceroute packets starts from a first time-to-live (TTL) value corresponding to the source node; and
the second set of traceroute packets starts from a second TTL value corresponding to the significant intermediate node.

3. The method of claim 1, wherein identifying the significant intermediate node comprises identifying an Internet protocol (IP) address or a time-to-live (TTL) value that appears more than once in the network topology information.

4. The method of claim 1, wherein:
the first set of traceroute packets comprises a first plurality of routing parameter combinations corresponding to the first probabilistic cover value; and
the second set of traceroute packets comprises a second plurality of routing parameter combinations corresponding to the second probabilistic cover value.

5. The method of claim 1, wherein the subsequent node is the destination node.

6. The method of claim 1, wherein the subsequent node is another significant intermediate node in the network segment.

7. The method of claim 1, further comprising identifying a plurality of significant intermediate nodes in the network segment, wherein a plurality of different sets of traceroute packets comprise, for each significant intermediate node of the plurality of significant intermediate nodes, a set of traceroute packets that starts from a time-to-live (TTL) value corresponding to the significant intermediate node.

8. The method of claim 1, further comprising identifying a plurality of significant intermediate nodes in the network segment, wherein a plurality of probabilistic cover values are calculated based on the plurality of significant intermediate nodes.

9. The method of claim 1, further comprising:
identifying a plurality of significant intermediate nodes in the network segment;

creating a plurality of estimates, each estimate indicating a reduction in traceroute packets corresponding to one of the plurality of significant intermediate nodes; and selecting one of the plurality of significant intermediate nodes based on the estimates.

10. A computer-implemented method, comprising:

receiving network topology information about a network segment between a source node and a destination node;

identifying, based on the network topology information, a significant intermediate node in the network segment, wherein the significant intermediate node is included in a plurality of different paths between the source node and the destination node;

causing a first plurality of groups of traceroute packets to be sent from the source node, wherein the traceroute packets in a particular group have the same routing parameters, wherein the traceroute packets in different groups have different routing parameters, and wherein each group in the first plurality of groups comprises increasing time-to-live (TTL) values starting from a first TTL value corresponding to the source node; and causing a second plurality of groups of traceroute packets to be sent from the source node, wherein each group in the second plurality of groups comprises increasing TTL values starting from a second TTL value that is different from the first TTL value and that corresponds to the significant intermediate node.

11. The method of claim 10, further comprising calculating a plurality of probabilistic cover values in response to identifying the significant intermediate node, wherein the plurality of probabilistic cover values comprise:

a first probabilistic cover value that is calculated based on a first plurality of potential paths from the source node to the significant intermediate node; and a second probabilistic cover value that is calculated based on a second plurality of potential paths from the significant intermediate node to a subsequent node in the network segment.

12. The method of claim 11, wherein:

the first plurality of groups of traceroute packets comprises a first plurality of routing parameter combinations corresponding to the first probabilistic cover value; and the second plurality of groups of traceroute packets comprises a second plurality of routing parameter combinations corresponding to the second probabilistic cover value.

13. The method of claim 11, wherein the subsequent node is the destination node.

14. The method of claim 11, wherein the subsequent node is another significant intermediate node in the network segment.

15. The method of claim 10, further comprising:

identifying a plurality of significant intermediate nodes in the network segment; and calculating a plurality of probabilistic cover values based on the plurality of significant intermediate nodes.

16. The method of claim 10, further comprising:

identifying a plurality of significant intermediate nodes in the network segment;

creating a plurality of estimates, each estimate indicating a reduction in traceroute packets corresponding to one of the plurality of significant intermediate nodes; and selecting one of the plurality of significant intermediate nodes based on the estimates.

17. A system for optimizing how test packets are sent during continuous network monitoring, comprising:

one or more processors;

memory in electronic communication with the one or more processors; and instructions stored in the memory, the instructions being executable by the one or more processors to:

receive network topology information about a network segment between a source node and a destination node;

identify, based on the network topology information, a significant intermediate node in the network segment, wherein the significant intermediate node is included in a plurality of different paths between the source node and the destination node;

cause a first plurality of groups of traceroute packets to be sent from the source node, wherein the traceroute packets in a particular group have the same routing parameters, wherein the traceroute packets in different groups have different routing parameters, and wherein each group in the first plurality of groups of traceroute packets comprises increasing time-to-live (TTL) values starting from a first TTL value corresponding to the source node; and cause a second plurality of groups of traceroute packets to be sent from the source node, wherein each group in the second plurality of groups of traceroute packets comprises increasing TTL values starting from a second TTL value that is different from the first TTL value and that corresponds to the significant intermediate node.

18. The system of claim 17, wherein:

the first plurality of groups of traceroute packets comprises a first plurality of routing parameter combinations; and the second plurality of groups of traceroute packets comprises a second plurality of routing parameter combinations.

19. The system of claim 17, further comprising additional instructions that are executable by the one or more processors to calculate a plurality of probabilistic cover values in response to identifying the significant intermediate node, and wherein the plurality of probabilistic cover values comprise:

a first probabilistic cover value that is calculated based on a first plurality of potential paths from the source node to the significant intermediate node; and a second probabilistic cover value that is calculated based on a second plurality of potential paths from the significant intermediate node to a subsequent node in the network segment.

* * * * *